United States Patent
Mihara et al.

(10) Patent No.: US 6,576,321 B2
(45) Date of Patent: Jun. 10, 2003

(54) OPTICAL RECORDING INFORMATION MEDIUM

(75) Inventors: Norihiko Mihara, Chiba (JP); Tadashi Koike, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/955,036

(22) Filed: Sep. 19, 2001

(65) Prior Publication Data

US 2002/0058119 A1 May 16, 2002

(30) Foreign Application Priority Data

Sep. 19, 2000 (JP) ........................................ 2000-283413

(51) Int. Cl.$^7$ ................................................. B32B 3/02
(52) U.S. Cl. ................ 428/64.1; 428/64.8; 430/270.14; 369/275.3
(58) Field of Search .............................. 428/64.1, 64.4, 428/64.8, 913; 430/270.14, 270.16, 270.17, 945; 369/275.3, 283, 288

(56) References Cited

U.S. PATENT DOCUMENTS 6,291,045 B1 * 9/2001 Tajima ...................... 428/64.1
6,338,888 B1 * 1/2002 Takase ...................... 428/64.1

FOREIGN PATENT DOCUMENTS

| JP | 08-156408 | 6/1996 |
| JP | 08-310121 | 11/1996 |
| JP | 09-267562 | 10/1997 |
| JP | 11-011015 | 1/1999 |
| JP | 11-105423 | 4/1999 |
| JP | 11-110815 | 4/1999 |

* cited by examiner

*Primary Examiner*—Elizabeth Mulvaney
(74) *Attorney, Agent, or Firm*—Burns, Doane, Swecker & Mathis, LLP

(57) ABSTRACT

An optical recording medium comprising a recording and a metal reflective layers on a transparent substrate having a groove, wherein the recording layer comprises an azaporphyrin metal complex dye with 1 to 4 meso-nitrogen atoms as a main component; recording and/or reproduction can be conducted using laser beams with wavelengths of $\lambda 1$ and $\lambda 2$ which is shorter than $\lambda 1$; a refractive index n of the recording layer is 2.0 or more at $\lambda 1$ and 1.8 or more at $\lambda 2$ as well as an attenuation coefficient k of the layer is 0.04 to 0.20 at $\lambda 1$ and 0.30 or less at $\lambda 2$; and the groove has a pitch of 0.70 to 0.85 $\mu$m, a half-value width of 0.20 to 0.35 $\mu$m and an inclination angle of 45 to 65°:

8 Claims, No Drawings

OPTICAL RECORDING INFORMATION MEDIUM

BACKGROUND OF THE INVENTION

1. Field of the Invention

This invention relates to a high-density optical recording medium, in particular an optical recording medium capable of recording and/or reproducing by a plurality of laser wavelengths.

2. Description of the Related Art

Optical recording media capable of recording comprising a dye in a recording layer where a reflective layer is deposited on the recording layer for increasing a reflectance have been disclosed in, for example, Optical Data Storage 1989 Technical Digest Series, Vol. 1, 45 (1989). Since then, media employing a cyanine or phthalocyanine dye in a recording layer have been widely marketed as a CDR. These media can record data with a semiconductor laser at 780 nm and have a characteristic that they are compatible in reproduction with a commercially available CD-ROM player equipped with a semiconductor laser device at 780 nm. Furthermore, a DVD-R (Digital Versatile Disk-Recordable) medium with a capacity of 4.7 GB has been recently proposed and has been commercially available, which is capable of recording/reproducing large data such as an image and a moving picture with a red semiconductor laser at 630 to 680 nm and can be reproduced by a DVD or DVD-ROM player. More recently, investigation has been started for an HD-DVDR (High Density DVDR) with a high density of 15 GB or more which can also deal with a high-definition moving picture as a blue-violet laser at 390 to 430 nm has been available.

For making a medium applicable to high-density recording/reproduction, a system must be modified along with reduction in a laser wavelength, while absolutely such system modification must take over and stably reproduce software resources such as development software previously widely spread in existing systems and databases accumulated for a long time.

In these circumstances, a read-only medium such as CD, CD-ROM, DVD-Video and DVD-ROM may be relatively easily reproduced by a modified player equipped with a short-wavelength laser device because it basically does not use a dye and thus a reflectance, a modulation factor and a tracking output are less dependent on a wavelength.

However, in an existing CDR medium using an organic dye in a recording layer, optical properties in a recording layer is considerably dependent on a wavelength so that a reflectance, a modulation degree and a tracking output largely vary depending on a wavelength. For example, a dye used in a recording layer has a reflectance of 65% or more for a light at about 780 nm while absorbing a red light at a wavelength from 630 to 680 nm so much that a reflectance is reduced to about 10%. Furthermore, a modulation degree is also reduced and in some cases significant distortion is observed in a recording waveform. If a reflectance is about 10%, it is very difficult to detect a signal. Even if a signal can be detected, an error rate or jitter is too high to conduct reproduction by a common player.

For reproducing a CDR with quality meeting specifications for CD and DVD at individual wavelengths, for example, JP-As 8-156408, 8-310121, 9-267562 and 11-11015 have proposed that two dyes having optical sensitivity (variation in a refractive index) at wavelengths of about 780 nm and in a range of 635 to 670 nm, respectively, may be used to achieve reproduction compatibility at these wavelengths by selecting a proper lamination structure and blending them in appropriate amounts in a recording layer. However, these lamination and blending techniques practically require very narrow and severe preparation conditions (control of a film thickness and of blending) for retaining satisfactory recording properties at each wavelength. Thus, these techniques are improper to practical medium preparation. Therefore, a DVD player is now equipped with an optical system comprising substantially two laser emitting diodes at 780 and 650 nm together within a chip, for reproducing DVD and CDR.

In an existing DVDR medium using an organic dye in a recording medium as in a CDR medium, the above wavelength dependence has not been also improved at all. Thus, even when using a DVD compatible signal which can be reproduced at about 650 nm with a reflectance of 45% or more, not only a reflectance but also a signal modulation factor may be too reduced to detect a signal. In terms of combining a red and a violet laser devices, these laser devices, in principle, have different compositions and it is thus difficult to integrate these laser devices in a chip. There has been, therefore, strongly needed proposal of an optical recording medium which can properly combine reproduction at these wavelengths. JP-As 11-110815 and 11-105423 have proposed a DVDR which can be reproduced with a blue laser using a dipenylaminosqualirium or cyanostyryl compound. According to our investigation, it, however, has a problem in processability so that it cannot provide a satisfactory recording film. Except that, there have been substantially no good proposals for a DVDR medium ensuring reproduction compatibility between red and violet wavelengths.

SUMMARY OF THE INVENTION

An objective of this invention is to provide an optical recording medium capable of providing a recording/reproduction signal meeting the DVD specifications and capable of recording and/or reproduction using a violet laser at a wavelength selected from a range of 390 to 430 nm.

For solving these problems, we have intensely conducted investigation and have finally found that an azaporphyrin metal complex with 1 to 4 meso-nitrogen atoms has sharp optical absorption bands, i.e., a Soret band (blue region) and a Q band (red region) exhibits proper balance between a higher refractive index and an appropriate attenuation coefficient at wavelengths in these bands and thus in these wavelengths gives a good reproduction signal, leading to this invention.

Thus, this invention provides:

[1] an optical recording medium comprising at least a recording layer and a metal reflective layer on a transparent substrate having a groove, wherein the recording layer comprises an azaporphyrin metal complex dye with 1 to 4 meso-nitrogen atoms represented by formula (1) as a main component; recording and/or reproduction can be conducted using a laser beam with a wavelength of $\lambda 1$ and also with a laser beam with a wavelength of $\lambda 2$ shorter than $\lambda 1$; the recording layer has a refractive index n of 2.0 or more at $\lambda 1$ and 1.8 or more at $\lambda 2$ as well as an attenuation coefficient k of 0.04 to 0.20 at $\lambda 1$ and 0.30 or less at $\lambda 2$; and the groove in the transparent substrate has a pitch of 0.70 to 0.85 $\mu$m, a half-value width of 0.20 to 0.35 $\mu$m and an inclination angle of 45 to 65°:

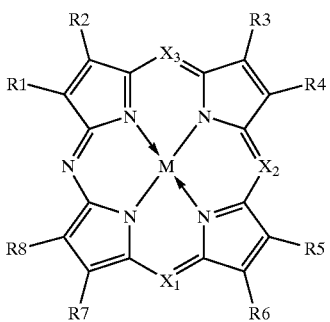

(1)

wherein $X_1$ to $X_3$ independently represent nitrogen or CH; R1 to R8 are independently selected from the group consisting of hydrogen, halogen, substituted or unsubstituted alkyl with 1 to 12 carbon atoms, substituted or unsubstituted aryl with 6 to 20 carbon atoms, hydroxyl, substituted or unsubstituted alkoxy, substituted or unsubstituted aryloxy, amino or alkylamino, nitro, cyano, carboxy, substituted or unsubstituted carboxylate, substituted or unsubstituted carboxamide, alkylthio, arylthio, sulfonic, substituted or unsubstituted sulfonate, substituted or unsubstituted sulfonamide, substituted or unsubstituted silyl and siloxy; and the central metal M represents transition metal which may be charged to have a cationic salt structure;

[2] the optical recording medium as described in [1] wherein recording and reproduction can be conducted using a laser beam at a wavelength of $\lambda 1$ while reproduction can be conducted using a laser beam at a wavelength of $\lambda 2$;

[3] the optical recording medium as described in [1] or [2] wherein the laser wavelength $\lambda 1$ is selected from the range of 630 to 680 nm while the laser wavelength $\lambda 2$ is selected from the range of 390 to 430 nm;

[4] the optical recording medium as described in any of [1] to [3] wherein as determined through the substrate, a reflectance of the laser with a wavelength of $\lambda 1$ is 40% or more while a reflectance of the laser with a wavelength of $\lambda 2$ is 15% or more.

According to this invention, a recording/reproduction signal meeting the DVD specifications may be obtained and an optical recording medium capable of recording and/or reproduction using a blue-violet laser with a wavelength selected from the range of 390 to 430 nm may be provided.

DETAILED DESCRIPTION OF THE PREFERRED EMBODIMENTS

According to this invention, an azaporphyrin dye having the above refractive index n and the above attenuation coefficient k may be used in a recording layer to provide an optical recording medium whereby recording and/or reproduction can be conducted with not only a red laser at a wavelength of 630 to 680 nm but also a blue-violet laser at a wavelength of 390 to 430 nm.

An azaporphyrin compound where four pyrrole rings were cyclized with at least one nitrogen atom had two large absorption peaks, i.e., a Soret band having an absorption edge within the range of 390 to 430 nm of interest and a Q band having a longer-wavelength side absorption edge within the range of 630 to 680 nm, and exhibited high refractive index properties in both wavelength bands. As the number of meso-nitrogen atoms increased, an absorption coefficient in the Q band was increased.

Preferred are here monoazaporphyrin, diazaporphyrin and triazaporphyrin structures in which rings are linked via 1 to 3 nitrogen atoms because the nitrogen number within these limits may ensure a high refractive index in both red and blue regions. In this respect, a diazaporphyrin is particularly preferable. A porphyrin with no nitrogen atoms does not provide any intensity of Q band so that a high refractive index of n>2.0 cannot be achieved in the range of 30 to 680 nm.

In the light of properties of an organic dye, a recording layer has the following optical constants; a refractive index n of 2.0 or more, preferably 2.0 to 2.7 and an attenuation coefficient of 0.04 to 0.20, preferably 0.04 to 0.15 at a wavelength of $\lambda 1$ selected from the range of 630 to 680 nm and n of 1.8 or more, preferably 2.0 or more and k of 0.30 or less, preferably 0.20 or less at a wavelength of $\lambda 2$ selected from the range of 390 to 430 nm.

When $\lambda 1$ meets $n(\lambda 1)<2.0$, a recording signal amplitude cannot be obtained at the wavelength. Acquiring $n(\lambda 1)>2.7$ in this kind of dye is not preferable because it at the same time requires the condition of $k(\lambda 1)>2.0$. Furthermore, when $k(\lambda 1)>0.20$, an optical absorption becomes so large, leading to excessive heat generation in a recording layer so that a fine recording pit cannot be stably formed. On the contrary, when k<0.04, recording sensitivity may not be obtained.

Similarly, when $n(\lambda 2)<1.8$ for a wavelength $\lambda 2$, a signal amplitude during recording at a wavelength $\lambda 2$ cannot be ensured while when $k(\lambda 2)>0.30$, absorption is also increased, leading to deterioration in a reproduction light signal at a wavelength $\lambda 2$.

It is preferable to introduce a substituent for improving optical properties as a recording film, durability, solubility and application properties. In particular, the azaporphyrin compound tends to be subject to association, leading to deterioration in optical properties (a refractive index). It is, therefore, desirable to introduce a substituent increasing steric hindrance in the molecule.

Examples of a variety of substituents which may be introduced in R1 to R8 in this compound include hydrogen; halogen such as fluorine, chlorine and bromine; substituted or unsubstituted alkyl with 1 to 12 carbon atoms such as methyl, ethyl, n-propyl, iso-propyl, n-butyl, sec-butyl, tert-butyl, n-pentyl, hexyl, amyl, cyclohexyl and methylcyclohexyl; aryl with 6 to 20 carbon atoms including aromatic rings such as phenyl and benzyl; ether such as methoxy, ethoxy, propoxy, butoxy, heptoxy and phenoxy; hydroxyl; substituted or unsubstituted alkoxy; substituted or unsubstituted aryloxy; amino or alkylamino; nitro; cyano; carboxy; substituted or unsubstituted carboxylate; substituted or unsubstituted carboxamide; alkylthio; arylthio; sulfonic; substituted or unsubstituted sulfonate; substituted or unsubstituted sulfonamide; substituted or unsubstituted silyl; and siloxy, which are independently selected. When two or more of these exist in one molecule, these substituents may be linked together. The central metal M represents a transition metal such as Ni, Co, Cu, Pd, Zn, Mn and Pt. The metal M may be charged to have a cationic salt structure.

A substrate used in this invention may be made of any transparent material because recording/reproduction is conducted with a light. Examples of a material which may be used include organic polymers such as polycarbonates, polyacrylates, polymethacrylates, polystyrene, polyesters, polyolefins and epoxy resins and inorganic materials such as glass. A polycarbonate resin is more preferable because it exhibits good balance between a light transmittance and heat resistance and may be easily molded. A polyolefin having a ring structure is also preferable because it exhibits reduced optical anisotropy, lower water absorptivity and good transparency in a blue-violet region.

Such a substrate may have, in its surface, a guide groove or pit for indicating a recording position and/or a prepit for, for example, partially read-only data. Such a guide groove or pit may be generally formed during preparing a substrate by injection molding, but alternatively may be formed by, for example, a laser cutting or 2P method.

For stably obtaining a tracking error output and a good reproduction signal without distortion even for an HF signal not only at $\lambda 1$, a recording/reproduction wavelength for DVD but also at $\lambda 2$ selected from the range of 390 to 420 nm which is shorter than $\lambda 1$, a groove pitch is, according to the specifications, limited to a range of 0.7 to 0.85 $\mu$m, preferably 0.74 to 0.80 $\mu$m for first achieving DVD reproduction compatibility. When evaluating reproduction compatibility at $\lambda 2$ under the pitch conditions, controlling a half-value width of a groove formed and an inclination angle in a cross section along the radius of the groove is important. It was found that the half-value width and the inclination angle were suitably within the ranges of 0.20 to 0.35 $\mu$m and 45 to 65°, respectively. In terms of a groove has a shape deviated from these ranges, for example, when a half-value width was more than 0.35 $\mu$m, a tracking error output could not be ensured at $\lambda 2$ while when a half-value width was less than 0.20 $\mu$m, distortion in an HF signal was increased. Furthermore, when an inclination angle is more than 65°, transcription failure reached a significant level during molding a substrate while when it is less than 45°, it became difficult to ensure a tracking error output at $\lambda 2$.

A recording layer used in this invention is basically made of a compound represented by formula (1), which may be irradiated with a laser beam to conduct recording. Alternatively, a recording layer may be made of the dye represented by formula (1) in combination with one or more additional dyes or may be made of a mixture of the dye represented by formula (1) and another dye in conjunction with a material other than a photoabsorptive material.

Examples of a dye which may be combined in this recording layer include macrocyclic azaannulene dyes such as phthalocyanine dyes, naphthalocyanine dyes and azaporphyrin dyes with 1 to 4 meso-nitrogen atoms other than the azaporphyrin represented by formula (1) of this invention; polymethyne dyes such as cyanine dyes, melocyanine dyes, squalilium dyes; anthraquinone dyes; azulenium dyes; azo dyes; and indoaniline dyes. Among these, particularly preferred are phthalocyanines exhibiting good durability and light stability.

A recording layer comprising a dye may be a monolayer or of a laminated structure of two or more layers wherein the dye represented by formula (1) may be used in only one layer or in two or more layers.

Examples of a dye which may be used in a lamination structure include macrocyclic azaannulene dyes such as phthalocyanine dyes, naphthalocyanine dyes and azaporphyrin dyes; polymethyne dyes such as cyanine dyes, melocyanine dyes, squalilium dyes; anthraquinone dyes; azulenium dyes; azo dyes; and indoaniline dyes.

The recording layer comprising a dye may be generally deposited by an appropriate application method such as spin coating, spray coating, dip coating and roll coating. Materials constituting a recording layer including a dye and a resinous binder may be dissolved in a solvent which does not harmful to the substrate, applied to the substrate and then dried. Preferable examples of a solvent which may be used include aliphatic or alicyclic hydrocarbons such as hexane, heptane, octane, decane and cyclohexane; aromatic hydrocarbons such as toluene and xylenes; ethers such as diethyl ether, dibutyl ether and tetrahydrofuran; alcohols such as methanol, ethanol, isopropanol, tetrafluoropropanol and methyl cellosolve; and halogenated compounds such as chloroform, dichloromethane and 1,2-dichloroathane, which may be used alone or in combination of two or more. When depositing two or more recording layers, a solvent which does not penetrate a previously applied layer is preferably selected.

A recording layer may be formed by vacuum deposition, which is effective when a recording layer material is insoluble in a solvent or a solvent not harmful to a substrate cannot be chosen.

A recording layer may have a thickness of 10 nm to 300 nm, desirably 40 nm to 150 nm.

A variety of base layers may be formed between a recording layer and a substrate for, e.g., preventing the recording layer from being deteriorated. For example, a layer made of an organic material such as polystyrene and poly(methyl methacrylate) or an inorganic material such as $SiO_2$ may be used. These may be used alone or in combination of two or more. Furthermore, two or more layers may be laminated.

A reflective layer made of a metal such as Au, Al, Pt, Ag and Ni, or an alloy thereof may be formed on the above recording layer. In particular, it is desirable to use gold which is stable to oxygen or moisture. A reflective layer may be deposited by an appropriate method such as vapor-phase deposition, sputtering and ion-plating to a thickness of 10 nm to 300 nm, desirably 30 nm to 150 nm.

An intermediate layer may be formed between a metal reflective layer and a recording layer for, e.g., improving interlayer adhesion and increasing a reflectance.

A protective layer may be formed on the above reflective layer, using, for example, a polymerizable material such as an acrylate or methacrylate which may be polymerized by a general radical reaction and an epoxy which may be subject to optical cationic polymerization. These resins may be formed by homopolymerization or copolymerization with other monomers or oligomers. These may be dissolved in a solvent before application. Among these, a UV curing material is preferable in the light of workability. A protective layer may be formed by an appropriate method such as spin coating, dip coating, bar coating and screen printing and frequently formed by spin coating because of its higher workability. The layer may be formed to a thickness of 1 $\mu$m to 100 $\mu$m, preferably 1 to 20 $\mu$m.

A protective layer thus formed may protect a recording and a reflective layers, but a more effective protective layer may be sometimes needed depending on a status of use. In such a case, the protective layer may be coated with an organic material such as a UV curing resin, a thermosetting resin and a solvent-containing polymer or an inorganic material such as $SiO_2$, which may be used alone or in combination of two or more. Two or more films may be laminated for, e.g., improving adhesiveness to other layers.

In another structure in this invention, a first substrate having a recording layer may be laminated with a second substrate. The second substrate may be the same as the first substrate. Alternatively, substrates on which a recording and a reflective layers have been formed are laminated together such that the recording layer sides of the substrates are faced to each other. Such lamination may be conducted by, e.g., a hot melt process, a process using a UV curing adhesive or a process using a one-liquid or two-liquid mixture type of reactive adhesive.

This invention will be specifically illustrated with reference to, but not limited to, Examples.

EXAMPLE 1

On an injection-molded polycarbonate substrate having a spiral groove (depth=150 nm; half-value width=0.33 μm; inclination angle: 63°; pitch=0.74 μm) with a thickness of 0.6 mm and a diameter of 120 mmφ was applied by spin coating a 20 g/L solution of an diazaporphyrin metal complex represented by formula (A) in dimethylcyclohexane at a rotation speed of 2000 rpm to form a recording layer to a thickness of 80 nm on the groove, and the product was dried at 70° C. for 1 hour. On the recording layer was deposited Au to a thickness of 80 nm using a sputtering apparatus (Balzers Ltd.; CDI-900). Then, on the reflective layer was applied a UV curing resin: SD-17 (Dainippon Ink And Chemicals, Incorporated) and the layer was cured by UV. On the surface was laminated another polycarbonate substrate with a thickness of 0.6 mm as described above using a radical polymerizable adhesive (JSR; Z8412H), which was then cured by UV rays to provide an optical recording medium.

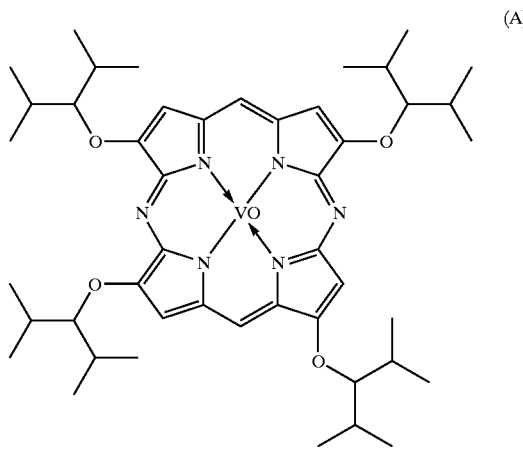

(A)

On the optical recording medium was recorded a repeated signal with a single frequency whose shortest pit length corresponded to 0.40 or 0.80 μm, at a linear velocity of 3.5 m/s using a disk tester (PULSTEC INDUSTRIAL CO., LTD; DDU1000: wavelength=658 nm, NA=0.60). The signal region was reproduced using a red laser (650 nm; NA=0.60) and a violet laser (405 nm: NA=0.65) to evaluate a reflectance (Rtop), a modulation degree (HF signal, evaluated by a pit length) and a CN ratio (CNR). The results are shown in Table 1.

EXAMPLE 2

A medium with a film thickness and a structure on a substrate as described in Example 1 was prepared except using the compound represented by formula (B) as an organic dye in a recording layer, and was evaluated for a signal as described in Example 1. The results are shown in Table 1.

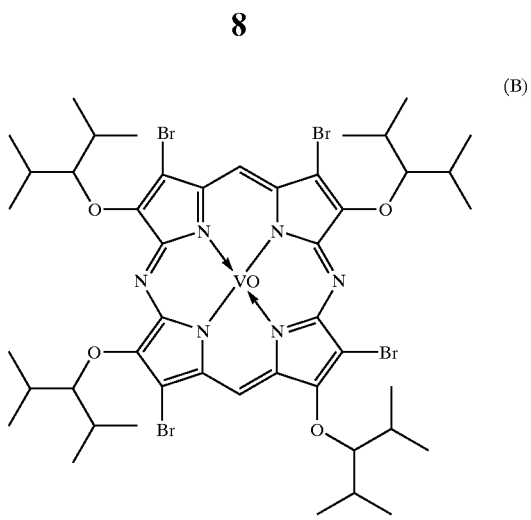

(B)

COMPARATIVE EXAMPLE 1

A medium with a film thickness and a structure on a substrate as described in Example 1 was prepared except using the compound represented by formula (C) as an organic dye in a recording layer, and was evaluated for a signal as described in Example 1. The results are shown in Table 1.

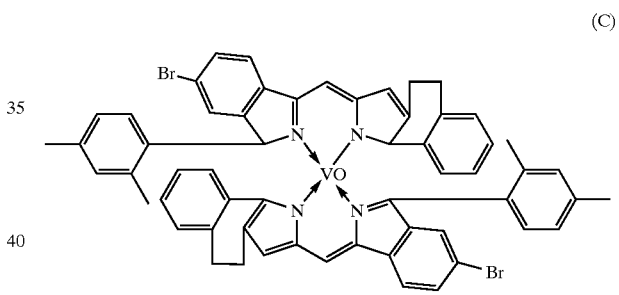

(C)

EXAMPLES 3–6 & COMPARATIVE EXAMPLES 2–5

Each medium was prepared as described in Example 1, using a substrate having a spiral groove of a pitch, a half-value width, an inclination angle and a depth shown in Table 1. The results are shown in Table 1.

As shown in Table 1, in the Comparative Example 1 whose reflective index in 405 nm (λ2) is less than 1.8, a tracking did not start in 405 nm and recording and reproduction were not completed. Moreover, even if it is satisfying a dye optical constant, especially when separating from the range of substrate groove shape defined in this invention, recording and reproduction were inferior to those of Examples in a short wavelength.

Good recording and reproduction are attained with two wavelengths, λ1 and λ2, by adjusting a dye optical constant and substrate groove shape in a range specified by this invention.

TABLE 1

| | Dye optical constant | | | | Substrate groove shape | | | 650 nm | | | | 405 nm | | | |
| --- | --- | --- | --- | --- | --- | --- | --- | --- | --- | --- | --- | --- | --- | --- | --- |
| | 650 nm | | 405 nm | | | | | | HF | | | | HF | | |
| | n | k | n | k | Pitch | Width | Angle | Rtop | 0.40 μm | 0.80 μm | CNR | Rtop | 0.40 μm | 0.80 μm | CNR |
| Ex. 1 | 2.21 | 0.06 | 1.98 | 0.07 | 0.74 | 0.33 | 63 | 45% | 0.35 | 0.65 | 55 dB | 25% | 0.55 | 0.75 | 48 dB |
| Ex. 2 | 2.12 | 0.07 | 2.00 | 0.10 | 0.74 | 0.33 | 63 | 45% | 0.33 | 0.60 | 54 dB | 22% | 0.50 | 0.65 | 49 dB |
| Ex. 3 | 2.21 | 0.06 | 1.98 | 0.07 | 0.74 | 0.22 | 60 | 46% | 0.33 | 0.60 | 49 dB | 28% | 0.55 | 0.72 | 51 dB |
| Ex. 4 | 2.21 | 0.06 | 1.98 | 0.07 | 0.74 | 0.35 | 60 | 46% | 0.34 | 0.65 | 55 dB | 25% | 0.53 | 0.70 | 50 dB |
| Ex. 5 | 2.21 | 0.06 | 1.98 | 0.07 | 0.74 | 0.29 | 49 | 52% | 0.29 | 0.60 | 49 dB | 30% | 0.40 | 0.60 | 45 dB |
| Ex. 6 | 2.21 | 0.06 | 1.98 | 0.07 | 0.74 | 0.23 | 50 | 53% | 0.27 | 0.60 | 48 dB | 30% | 0.44 | 0.60 | 47 dB |
| Comp. Ex. 1 | 2.54 | 0.12 | 1.60 | 0.10 | 0.74 | 0.33 | 63 | 50% | 0.35 | 0.70 | 58 dB | 10% | not tracked | | |
| Comp. Ex. 2 | 2.21 | 0.06 | 1.98 | 0.07 | 0.74 | 0.40 | 60 | 47% | 0.35 | 0.65 | 56 dB | | not tracked | | |
| Comp. Ex. 3 | 2.21 | 0.06 | 1.98 | 0.07 | 0.74 | 0.35 | 40 | 55% | 0.27 | 0.55 | 48 dB | 20% | 0.30 | 0.45 | 45 dB |
| Comp. Ex. 4 | 2.21 | 0.06 | 1.98 | 0.07 | 0.74 | 0.18 | 61 | 49% | 0.22 | 0.55 | 45 dB | 22% | 0.25 | 0.44 | 45 dB |
| Comp. Ex. 5 | 2.21 | 0.06 | 1.98 | 0.07 | 0.74 | 0.18 | 43 | | not tracked | | | | — | | |

What is claimed is:

1. An optical recording medium comprising at least a recording layer and a metal reflective layer on a transparent substrate having a groove, wherein the recording layer comprises an azaporphyrin metal complex dye with 1 to 4 meso-nitrogen atoms represented by formula (1) as a main component; recording and/or reproduction can be conducted using a laser beam with a wavelength of $\lambda 1$ and also with a laser beam with a wavelength of $\lambda 2$ shorter than $\lambda 1$; the recording layer has a refractive index n of 2.0 or more at $\lambda 1$ and 1.8 or more at $\lambda 2$ as well as an attenuation coefficient k of 0.04 to 0.20 at $\lambda 1$ and 0.30 or less at $\lambda 2$; and the groove in the transparent substrate has a pitch of 0.70 to 0.85 μm, a half-value width of 0.20 to 0.35 μm and an inclination angle of 45 to 65°:

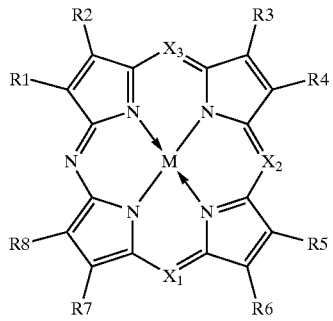

(1)

wherein $X_1$ to $X_3$ independently represent nitrogen or CH; R1 to R8 are independently selected from the group consisting of hydrogen, halogen, substituted or unsubstituted alkyl with 1 to 12 carbon atoms, substituted or unsubstituted aryl with 6 to 20 carbon atoms, hydroxyl, substituted or unsubstituted alkoxy, substituted or unsubstituted aryloxy, amino or alkylamino, nitro, cyano, carboxy, substituted or unsubstituted carboxylate, substituted or unsubstituted carboxamide, alkylthio, arylthio, sulfonic, substituted or unsubstituted sulfonate, substituted or unsubstituted sulfonamide, substituted or unsubstituted silyl and siloxy; and the central metal M represents transition metal which may be charged to have a cationic salt structure.

2. The optical recording medium as claimed in claim 1 wherein recording and reproduction can be conducted using a laser beam at a wavelength of $\lambda 1$ while reproduction can be conducted using a laser beam at a wavelength of $\lambda 2$.

3. The optical recording medium as claimed in claim 1 wherein the laser wavelength $\lambda 1$ is selected from the range of 630 to 680 nm while the laser wavelength $\lambda 2$ is selected from the range of 390 to 430 nm.

4. The optical recording medium as claimed in claim 2 wherein the laser wavelength $\lambda 1$ is selected from the range of 630 to 680 nm while the laser wavelength $\lambda 2$ is selected from the range of 390 to 430 nm.

5. The optical recording medium as claimed in claim 1 wherein as determined through the substrate, a reflectance of the laser with a wavelength of $\lambda 1$ is 40% or more while a reflectance of the laser with a wavelength of $\lambda 2$ is 15% or more.

6. The optical recording medium as claimed in claim 2 wherein as determined through the substrate, a reflectance of the laser with a wavelength of 1 is 40% or more while a reflectance of the laser with a wavelength of $\lambda 2$ is 15% or more.

7. The optical recording medium as claimed in claim 3 wherein as determined through the substrate, a reflectance of the laser with a wavelength of $\lambda 1$ is 40% or more while a reflectance of the laser with a wavelength of $\lambda 2$ is 15% or more.

8. The optical recording medium as claimed in claim 4 wherein as determined through the substrate, a reflectance of the laser with a wavelength of $\lambda 1$ is 40% or more while a reflection of the laser with a wavelength of $\lambda 2$ is 15% or more.

* * * * *